United States Patent
Danzmann et al.

Patent Number: 5,837,148
Date of Patent: Nov. 17, 1998

[54] NITRATE RECOVERY PLANT

[75] Inventors: Erich Danzmann, Bergkamen; Wilhelm-Heinrich Trautmann; Bernd Muskulus, both of Burbach; Bernd Neitzert, Wissen; Frank Zips, Eschenburg, all of Germany

[73] Assignee: Dynamit Nobel Atkiengesellschaft, Troisdorf, Germany

[21] Appl. No.: 809,486

[22] PCT Filed: Sep. 12, 1995

[86] PCT No.: PCT/EP95/03590

§ 371 Date: Mar. 17, 1997

§ 102(e) Date: Mar. 17, 1997

[87] PCT Pub. No.: WO96/08447

PCT Pub. Date: Mar. 21, 1996

[30] Foreign Application Priority Data

Sep. 15, 1994 [DE] Germany .......................... 44 32 840.0

[51] Int. Cl.⁶ .................................. C02F 1/72; C02F 1/78
[52] U.S. Cl. .......................... 210/758; 210/759; 210/760; 210/903; 159/47.3
[58] Field of Search .................... 210/758, 759, 210/760, 903; 159/47.3

[56] References Cited

U.S. PATENT DOCUMENTS

| | | | |
|---|---|---|---|
| 4,971,777 | 11/1990 | Firnhaber et al. | 423/235 |
| 5,167,834 | 12/1992 | Gallup | 210/903 |
| 5,182,027 | 1/1993 | Gallup et al. | 210/903 |
| 5,183,577 | 2/1993 | Lehmann | 210/903 |

FOREIGN PATENT DOCUMENTS

| | | |
|---|---|---|
| 54-4103255 | 8/1979 | Japan . |
| 54-4118292 | 9/1979 | Japan . |

Primary Examiner—Jay H. Woo
Assistant Examiner—Betsey J. Morrison
Attorney, Agent, or Firm—Antonelli, Terry, Stout & Kraus, LLP

[57] ABSTRACT

A process for removing inorganic and/or oxidizable nitrogen compounds from industrial effluent. The nitrogen compounds in the effluent can be simultaneously recovered for use in production processes. The method for eliminates inorganic nitrogen compounds from wastewater, by neutralizing wastewater with a neutralizer to a pH of approximately 7 to obtain a neutralized solution. The neutralizer is a sodium hydroxide solution or ammonia. Next the neutralized solution is evaporated. The inorganic nitrate compounds present in the inorganic nitrogen compounds are eliminated from the wastewater in the form of the corresponding neutralized nitrate.

9 Claims, 1 Drawing Sheet

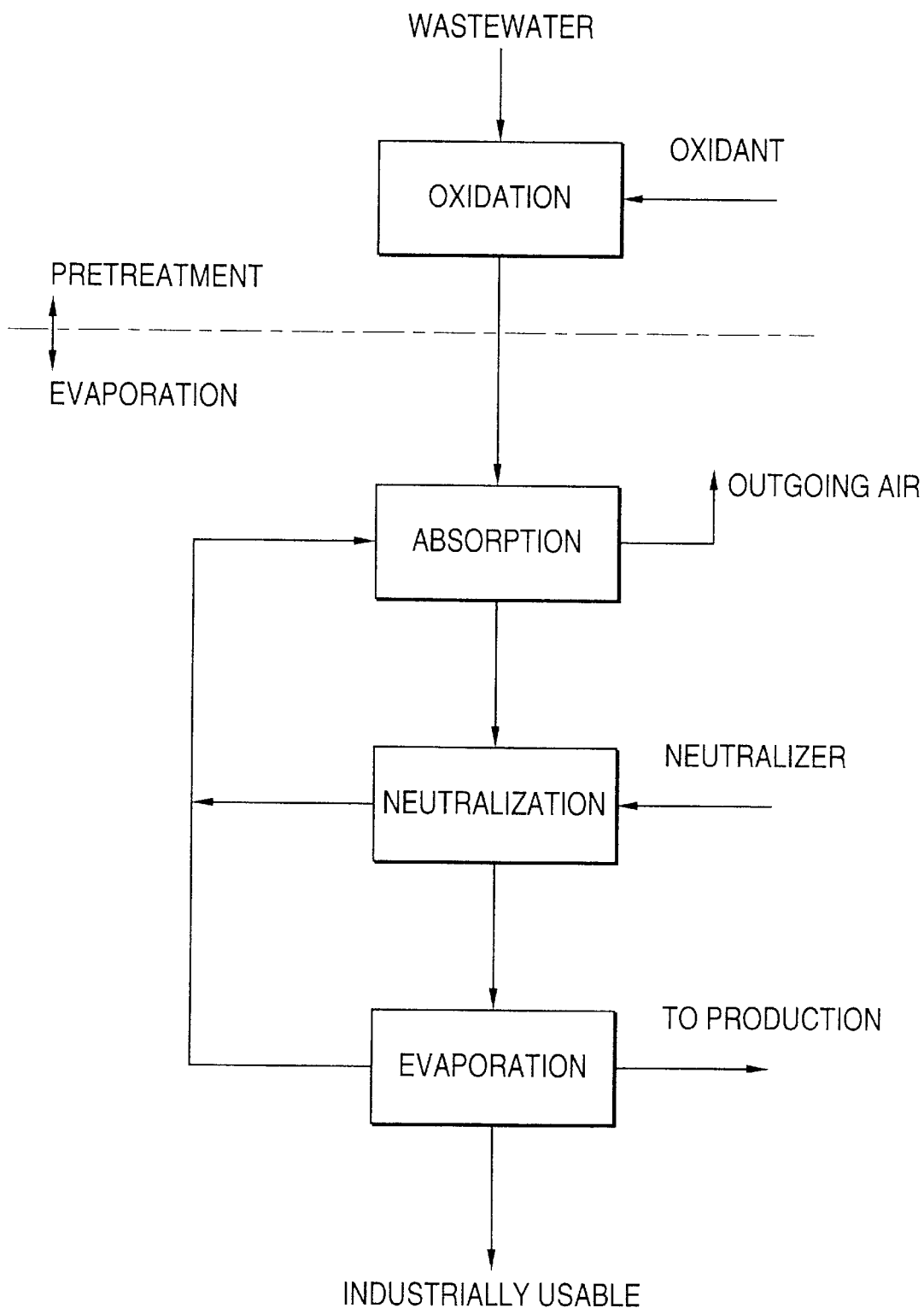

NITRATE RECOVERY PLANT

The invention relates to a method for eliminating inorganic and/or oxidizable nitrogen compounds from industrial wastewater and simultaneously using the nitrogen compounds contained in the wastewater as valuable industrial materials.

In 1986, 13% of the nitrogen input of 790,000 t N/a in the Federal Republic of Germany came directly from industry (Wieting, J.; Wolf., P.; Wasser Boden 10(1990), pp. 646–648). Nitrogen compounds endanger water ecology primarily through eutrophication by the ammonium, nitrite, and nitrate introduced. The intake of these substances in the diet via groundwater so affected significantly increases the risk of cancer for example owing to the carcinogenic effect of nitrosamines. For this reason, efforts are being made to keep the concentration of these materials as low as possible. Thus far, biological treatment methods, namely nitrification and denitrification, have been used for this purpose. Here, the end product of the reaction is elemental nitrogen which escapes into the atmosphere. The drawback of these treatment methods is that industrially valuable substances such as nitrate and ammonium are unavailable for industrial use. Moreover, this method leads to sludge formation with additional disposal problems.

In many chemical reaction processes such as the manufacture of nitric acid esters such as glycerol trinitrate, ethylene glycol dinitrate, etc. or nitro aromatics, e.g. trinitrotoluene, nitrobenzene, etc. appear in the subsequent product washings and in the wastewater from $NO_x$ washing, which contain high levels of nitrates and other nitrogen compounds. These normally acid wastewaters are generally neutralized with sodium hydroxide solution or milk of lime before going to the sewage treatment plant. The nitrates and nitrites produced by neutralization, together with the other nitrogen-containing compounds, are not only wasted in this process but they are also a burden on the biological sewage treatment plants and outlet channels.

Biological purification of such wastewater has become a particular financial problem for industry because of the high level of inorganic nitrate because the cost burden of wastewater treatment continues to increase through cost assumption of investment outlays by disposal associations, rising sewer fees and charges, and proportional operating costs.

BRIEF DESCRIPTION OF THE FIGURE

FIG. 1 shows a flow chart of how nitrogen compounds are eliminated from industrial wastewater and recovered for industrial use in accordance with an embodiment of the invention. Wastewater is processed through oxidation, absorption, neutralization and evaporation steps to obtain nitrogen compounds which may be recycled for industrial use.

The goal of the present invention was to produce a method for eliminating inorganic and/or oxidizable nitrogen compounds in industrial wastewater while simultaneously using the nitrogen compounds contained in the wastewater as materials useful for industry.

According to the invention, the inorganic nitrate is eliminated by extracting the nitrate portion from the wastewater as a recyclable material. This is achieved by neutralizing the acid wastewater to a pH of approximately 7 by adding sodium hydroxide solution or ammonia, preferably ammonia, as a neutralizer. The neutralized solution is then evaporated. When ammonia is used as a neutralizer, both ammonia gas and ammonia solution or ammonia water can be used as a neutralizer according to the invention. The advantage of ammonia gas is that it is easy to procure and does not contribute additional water to the neutralization reaction. It is disadvantageous that the neutralization container must be kept completely gastight and increased expenditure overall of MSR (measurement, control, and regulation) technology is necessary. An ammonia solution or ammonia water is relatively unproblematic on the other hand and can be handled safely. The circumstance that the parts of the plant also used for neutralization with sodium hydroxide solution can also be used when ammonia solution or ammonia water is used is particularly advantageous. Surprisingly, it was determined that, when a nitrate-containing wastewater is neutralized with ammonia water to a pH of approximately 7 and then evaporated, an ammonia nitrate concentrate of up to 80% is obtained and this can for example be incorporated directly into the manufacture of emulsion explosives or can serve for example as the basis for fertilizer manufacture. The concentrate that results can be recycled into the production loop. In order effectively to prevent autocatalytic and thermal decomposition of the nitrates at a low pH when the neutralized solution is evaporated, the pH should be stabilized.

If the wastewater contains not only nitrate but also nitrite, ammonium, and/or nitrous gases, a limitation is imposed on the use of the method described above as these substances cannot be removed or rendered usable by neutralization. In wastewaters that contain these impurities, the condensate produced by evaporation, because the $NO_x$ and ammonia gases are entrained, has such a high total nitrogen level that the condensate cannot be used or disposed of without prior biological treatment. Surprisingly, this problem can be solved by performing oxidation prior to neutralization. With this process, the nitrite contained in the wastewater is oxidized into nitrate, which reduces the level of toxic nitrite to a minimum while at the same time more reusable nitrate becomes available. As well, by the addition of the oxidant, for example by adding hydrogen peroxide, the likewise toxic ammonia, which is in pH equilibrium with $NH_3$, and the nitrous gas (NOx), are oxidized. Any organic impurities that may be present are removed at the same time by oxidation to carbon dioxide and water. Ozone, oxygen, and hydrogen peroxide solution can be used as the oxidants. Hydrogen peroxide is particularly preferred since even if too much is used it decomposes into water and oxygen with no adverse effect on the environment and presents no technical processing problems. At the same time, when hydrogen peroxide is used as the oxidant, the COD is reduced. In this way, not only can better ammonia nitrate yields be achieved but also a condensate is produced which has a considerably lower total nitrogen content. This condensate is preferably recycled into production as washing water or can, in advantageous cases, also be fed directly into the outlet channel. Any ammonia still present is removed from the condensate by stripping and recycled to neutralization. The oxidation process is preferably monitored on-line by determining the quantity of oxidant necessary and adding it accordingly. If the wastewater contains organic nitrates that present an explosion hazard and/or are toxic, heat treatment according to DE 38 13 184 is performed before the neutralization stage for safety and/or environmental reasons.

The concept of the invention is illustrated in greater detail in the flowchart of FIG. 1 with a special wastewater.

Evaporation systems known of themselves can be used in implementing the method according to the invention. A single or multistage evaporation plant can be used, for example a four-stage continuously operating downdraft evaporation plant. Depending on the composition of the wastewater, the plant can operate with or without a previous oxidation stage.

The present invention thus makes it possible to purify wastewater containing nitrogen compounds in an environmentally benign fashion and at the same time recycle these valuable nitrogen compounds.

We claim:

1. Method for eliminating inorganic nitrogen compounds from wastewater, comprising the steps of neutralizing wastewater with a neutralizer to a pH of approximately 7 to obtain a neutralized solution, wherein the neutralizer is a sodium hydroxide solution or ammonia, and evaporating said neutralized solution, whereby inorganic nitrate compounds present in the inorganic nitrogen compounds are eliminated from the wastewater in the form of the corresponding neutralized nitrate.

2. Method for eliminating inorganic nitrogen compounds from wastewater according to claim 1, wherein said neutralizer is ammonia in the form of gas or a solution.

3. Method according to claim 1, further comprising the step of heating the nitrogen compounds before the neutralizing step.

4. Method of claim 1, wherein the neutralized nitrate comprises a nitrate salt.

5. Method for eliminating oxidizable nitrogen compounds in wastewater, comprising the steps of: oxidizing oxidizable nitrogen-containing materials in the wastewater with an oxidant, neutralizing the wastewater so treated to a pH of approximately 7 to obtain a neutralized solution using sodium hydroxide solution or ammonia, and evaporating the neutralized solution to remove nitrates from the wastewater in the form of neutralized nitrates.

6. Method according to claim 5, wherein ozone, nitrogen, or hydrogen peroxide is used as the oxidant.

7. Method according to claim 6, wherein hydrogen peroxide is the oxidant.

8. Method according to claim 5, further comprising the step of adding a pH stabilizer to the wastewater before evaporation.

9. Method according to claim 5, wherein the step of oxidizing oxidizable nitrogen-containing materials is monitored on-line and the oxidant is added as necessary.

* * * * *